(12) United States Patent
Sørensen et al.

(10) Patent No.: US 7,207,350 B2
(45) Date of Patent: Apr. 24, 2007

(54) PRESSURE VALVE

(75) Inventors: Emil Aarestrup Sørensen, Stanstad (CH); Hans-Henrik Pedersen Raagaard, Lynge (DK)

(73) Assignee: Pres-Vac Engineering A/S, Allerød (DK)

(*) Notice: Subject to any disclaimer, the term of this patent is extended or adjusted under 35 U.S.C. 154(b) by 300 days.

(21) Appl. No.: 10/477,353

(22) PCT Filed: May 24, 2002

(86) PCT No.: PCT/DK02/00350

§ 371 (c)(1),
(2), (4) Date: Jan. 9, 2004

(87) PCT Pub. No.: WO02/095275

PCT Pub. Date: Nov. 28, 2002

(65) Prior Publication Data

US 2004/0177883 A1   Sep. 16, 2004

(30) Foreign Application Priority Data

May 25, 2001 (DK) ............................... 2001 00847

(51) Int. Cl.
*F16K 17/06* (2006.01)
*F16K 17/08* (2006.01)
*F16K 17/12* (2006.01)

(52) U.S. Cl. ............... 137/529; 137/471; 137/493.8

(58) Field of Classification Search ............ 137/471, 137/493.8, 529; 251/65
See application file for complete search history.

(56) References Cited

U.S. PATENT DOCUMENTS 2,367,260 A * 1/1945 Beddoes .................. 137/529
2,700,395 A * 1/1955 Young ...................... 137/529
3,454,040 A * 7/1969 Dunkelis ..................... 251/65
4,091,837 A * 5/1978 Edmunds et al. ............ 251/65

(Continued)

FOREIGN PATENT DOCUMENTS

JP            5140623          4/1976

(Continued)

OTHER PUBLICATIONS

English Abstract of JP1-96582.

(Continued)

*Primary Examiner*—John Rivell
(74) *Attorney, Agent, or Firm*—Dykema Gossett PLLC

(57) ABSTRACT

The invention relates to a pressure valve with a flow passage (3) having a valve body (14) and a lifting plate (21) that has a surface area $A_2$ transversally of the flow passage (3) that exceeds the cross sectional area $A_1$ of the flow passage (3) at the valve seat (13) of the valve body, said pressure valve being configured such that, at any time, the container is in communication with the area above the lifting plate (21). The invention is characterised in that the pressure valve also comprises a magnet (8) and a magnetisable body (9); and that the force of attraction $F_m$ between the magnet (8) and the magnetisable body (9) and the mass of the lifting plate (21) contributes to defining the abutment force $F_c$, of the valve body (14) against the valve seat (13) in the closed state of the pressure valve.

8 Claims, 3 Drawing Sheets

U.S. PATENT DOCUMENTS

| | | | |
|---|---|---|---|
| 5,050,639 A * | 9/1991 | Sorensen | 137/529 |
| 5,060,688 A * | 10/1991 | Sorensen | 137/471 |
| 5,607,001 A * | 3/1997 | Petersen | 141/59 |
| 5,873,384 A * | 2/1999 | Pedersen et al. | 137/471 |
| 6,029,706 A * | 2/2000 | Joo, II | 137/493.8 |
| 6,585,000 B2 * | 7/2003 | Radford | 251/65 |

FOREIGN PATENT DOCUMENTS

| | | |
|---|---|---|
| JP | 196582 | 6/1989 |
| WO | 9601962 | 1/1996 |

OTHER PUBLICATIONS

English Abstract of JP51-40623.

* cited by examiner

PRESSURE VALVE

BACKGROUND OF THE INVENTION

1. Field of the Invention

The present invention relates to a pressure valve for equalising pressure differences between a closed container or tank and the surrounding atmosphere. In particular, the invention relates to a pressure valve for use in connection with a cargo hold or a tank in a maritime carrier. However, the invention also lends itself for use in connection with stationary tanks or tanks supported by wheels.

2. The Prior Art

For instance, U.S. Pat. No. 5,873,384 to the present applicant, which is incorporated herein in its entirety by the present reference, teaches a pressure valve of the kind featured in the preamble to claim 1.

When a tank is loaded with a given volume of liquid per time unit, pressure valves of this type open when the gas pressure within the tank reaches a pre-defined opening pressure and a gas volume per time unit which corresponds to the product volume loaded per time unit plus any evaporation from the liquid surface in the tank is then to be blown out. The blown-out volume per time unit depends on the flow resistance of the valve and of the pressure prevailing within the tank. The maximum blown-out volume per time unit minus any evaporation, which may occur without the pressure within the tank exceeding a given safety threshold value $P_{max}$, is designated the capacity of the pressure valve. The capacity of the pressure valve determines the maximally allowable loaded volume per time unit. When, upon interruption of the loading, the pressure within the tank drops to a certain value, i.e. the closing pressure of the pressure valve, which is lower than the opening pressure, the pressure valve closes. In the known pressure valves, the closing pressure is considerably lower than the opening pressure. Additionally any increase or drop in the ambient temperature during storage or transport of eg petroleum products or chemicals leads to boiling-off which may bring about pressure changes within the container, which in this case will cause the pressure valve to open and close in fundamentally the same manner as during loading and unloading.

Another use of pressure valves applies when, for safety reasons, it is required to supply an inert gas, such as nitrogen, to the free space of the container above the product being transported. For instance, the product may be an inflammable liquid or a material, such as oranges and lemons, that gives off inflammable gasses, following protracted storage. The inert gas is automatically kept at a predetermined pressure that may be above the atmospheric pressure, but below the opening pressure of the pressure valve. In this case any rise or a drop in the temperature of the surroundings will give rise to a corresponding change in the pressure of the inert gas within the container, whereby the pressure valve must open.

In the known pressure valves, it has been found that the difference between the opening pressure of the valve and the closing pressure, due to the design of the pressure valves, is too large for the pressure valves to be optimally suited for use in the transport of certain materials. It is thus the object of the present invention to provide a pressure valve of the kind described above, wherein the difference between the opening pressure and the closing pressure can be reduced to about 10%–20% of the closing pressure. When eg fruit is transported, it is hereby possible to obtain a reduction in the amount of inert gas that must be supplied when the ambient temperature drops, following initial blow-out through the pressure valve.

This is obtained by the features given in the characterising part of claim 1.

By the embodiments featured in the dependent claims, a particularly convenient configuration of the characteristic curve of the pressure valve during the course of the opening is obtained. In particular by the measures featured in claim 10, a considerable reduction of the difference between the opening pressure and the closing pressure is obtained. The relations given in claim 10 should be complied with throughout the entire area of movement of the lifting plate.

The invention will now be explained in further detail with reference to the embodiment shown in the drawings.

BRIEF DESCRIPTION OF THE DRAWINGS

FIG. 1b is a sectional view of the pressure valve shown in FIG. 1a;

DETAILED DESCRIPTION OF THE PREFERRED EMBODIMENT

Figure 1B:
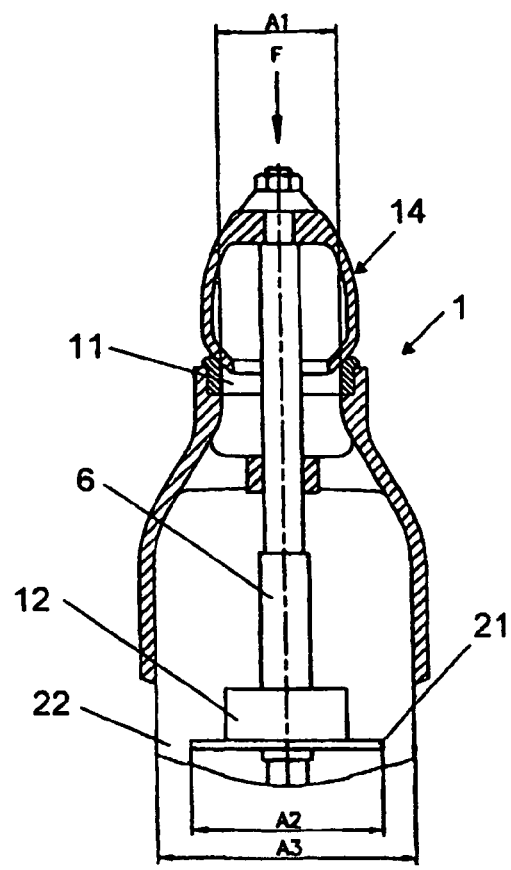
Figure 1A:
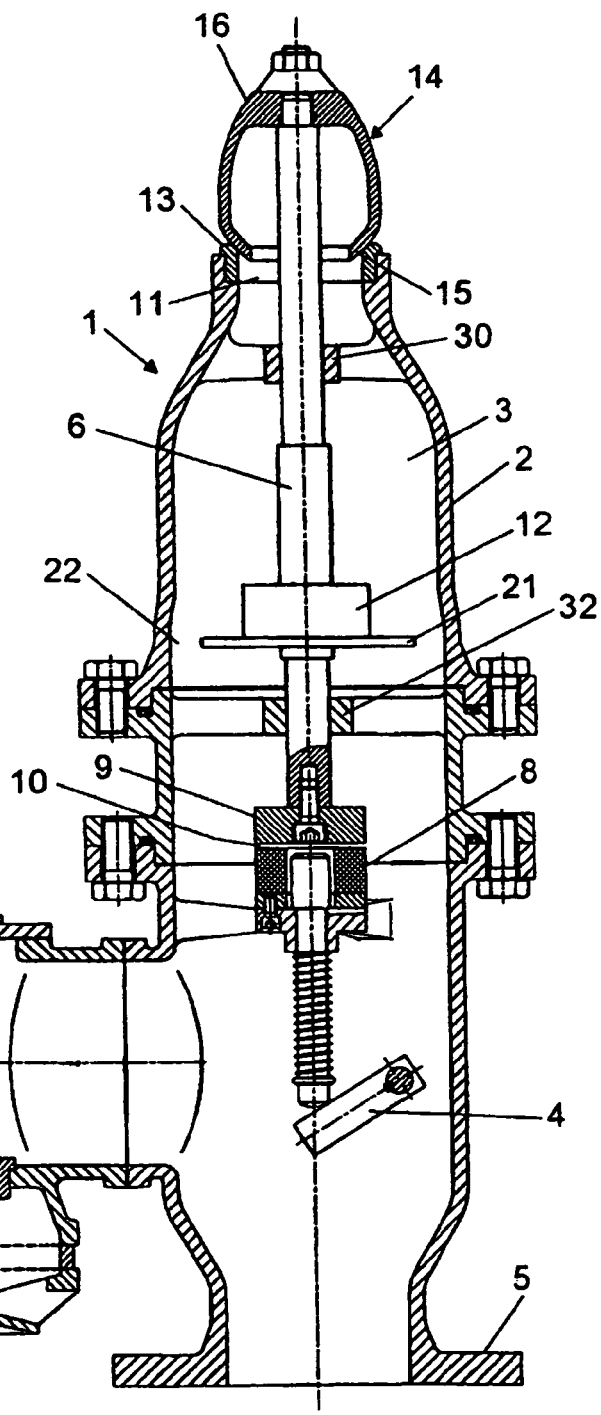
FIG. 1a shows a pressure valve according to the invention, seen in a cross sectional view and in the closed state of the valve.

In FIG. 1a the reference numeral 1 is used to show a vertically oriented valve housing having, at the bottom, a flange 5, by which the valve housing 1 can be bolted to a pressure release stub on a gas-filled container, eg a tank or a cargo hold on a ship, or to the top end of a pressure relief tube that is connected to one or more such containers.

The pressure valve 1 has a tubular wall 2 that defines a through-going flow passage 3 with a outflow mouthing 11, whereby gas in the subjacent container may escape to the free atmosphere under particular pressure conditions. The flow passage 3 preferably has a circular cross section, but other cross-sectional configurations may be selected, including eg a rectangular cross-section. If desired a lateral opening can be provided in the tubular wall 2, to which a vacuum relief valve 7 is connected that does not constitute a part of the invention.

In the outflow mouthing 11, an annular valve seat 13 is mounted that is configured to co-operate with a valve face 15 on the lower face of a valve body 14. The valve body 14 is movably journalled so as to be displaceable between the entirely open state of the pressure valve and the closed state of the pressure valve. Suitable stop elements serve to delimit the movement of the valve body 14.

In FIG. 1a the pressure valve is shown in the closed state, where the valve face 15 abuts closely on the valve seat 13. The valve seat 13 and the valve face 15 may preferably have a conical shape, and the valve body 14 preferably has a surface portion 16 which, in a conventional manner, is configured so as to allow a flow of gas flowing from the container upwards around the valve body 14 to be combined to an aggregate upwardly oriented jet of gas above the valve housing 1. Hereby the current safety regulations are complied with. To this end, the valve body 14 preferably has the shown, drop-like shape.

To the valve body 14, a rod-shaped connecting element 6 is rigidly attached that extends down through the valve housing 1. The connecting element 6 is conveyed in guides 30, 32 and is displaced along the flow passage 3. On the connecting element 6, a weight load 12 and a lifting plate 21 are firmly mounted, there being between the lifting plate 21 and the wall 2 a gap 22. When, in this area, the flow passage 3 has a circular cross section, the lifting plate can be configured as a disc, whereby the gap 22 becomes annular.

Preferably the lifting plate 21 is configured with an uninterrupted surface, whereby gas in the flow passage 3 flows around the lifting plate 21 to the area above the lifting plate 21 through the gap 22. However, nothing prevents the lifting plate 21 from having a number of through-going channels. What matters is that the lifting plate 21 transversally to the flow passage 3 defines an area $A_2$ (see FIG. 1*b*) that gives rise to a pressure loss in a flow of gas within the flow passage 3.

As shown in FIG. 1*a*, the pressure valve also comprises an actuator unit 4 for producing a control movement of the connecting element 6 and thus of the valve body 14. The actuator unit can be operated from the exterior of the valve housing 1 by means of a not shown handle.

In association with the connecting element the pressure valve also comprises a magnet 8 that may, as shown, be mounted in the flow passage 3 below the lifting plate 21, and a magnetisable body 9 that is configured for being able to cooperate with the magnet 8 in the closed state of the pressure valve. The magnet 8 and the body 9 may optionally be located in the area at the outflow mouthing 11, which is preferred when there is a need for achieving regular access to the magnet 8. This may either be a permanent magnet or eg an electro-magnet.

In the closed position shown in FIG. 1*a*, the valve body 14 influences the valve seat 13 by a downwardly oriented abutment force $F_c$ that contains contributions from the mass of the valve body 14, the mass of the connecting element 6, the mass of the weight load 12, the mass of either the magnet 8 or the body 9, depending on which of these parts is mounted on the connecting element 6, and from the force of attraction $F_m$ between the magnet 8 and the body 9. The abutment force $F_c$ is thus to be understood as the force that keeps the pressure valve closed, ie the closing force of the pressure valve. It is shown in FIG. 1*a* how the abutment force $F_c$ may be changed eg by varying the position relative to each other of the magnet 8 and the body 9, a gap 10 of a given size optionally being present in the closed position of the pressure valve.

When, in the container, the pressure rises above atmospheric pressure such pressure will, due to the gap 22, also reign in the space between the lifting plate 21 and the valve body 14. The pressure in this space is thereby equal to the pressure within the container, and the pressure influences the top face and lower face of the lifting plate 21 by the same force. As long as the superatmospheric pressure does not give rise to an upwardly oriented force on the valve body 14 that exceeds the closing force $F_c$ of the pressure valve, the pressure valve will remain in the closed state. The upwardly oriented force on the valve body 14 can be determined as the superatmospheric pressure in the container multiplied by the area $A_1$ of the mouthing 11 of the flow passage 3, see FIG. 1*b*.

When the superatmospheric pressure exceeds the closing force $F_c$ of the pressure valve, the pressure valve opens. The outflow of gas causes the pressure on the face of the lifting plate 21 that faces towards the mouthing to drop. The upwardly oriented movement of the valve body 14 towards the entirely open position of the pressure valve is then controlled to a certain extent by the force exerted by the flowing gas on the lower face of the lifting plate 21. This influence can be determined as the superatmospheric pressure of the container multiplied by the area $A_2$ of the lifting plate. Since this area exceeds the area $A_1$ of the outflow mouthing 11, the lifting power of the gas on the lifting plate 21 increases, and the rate of movement of the lifting plate 21 and hence of the valve body 14 in a direction towards the entirely open state of the pressure valve increases.

Figures 2, 3:
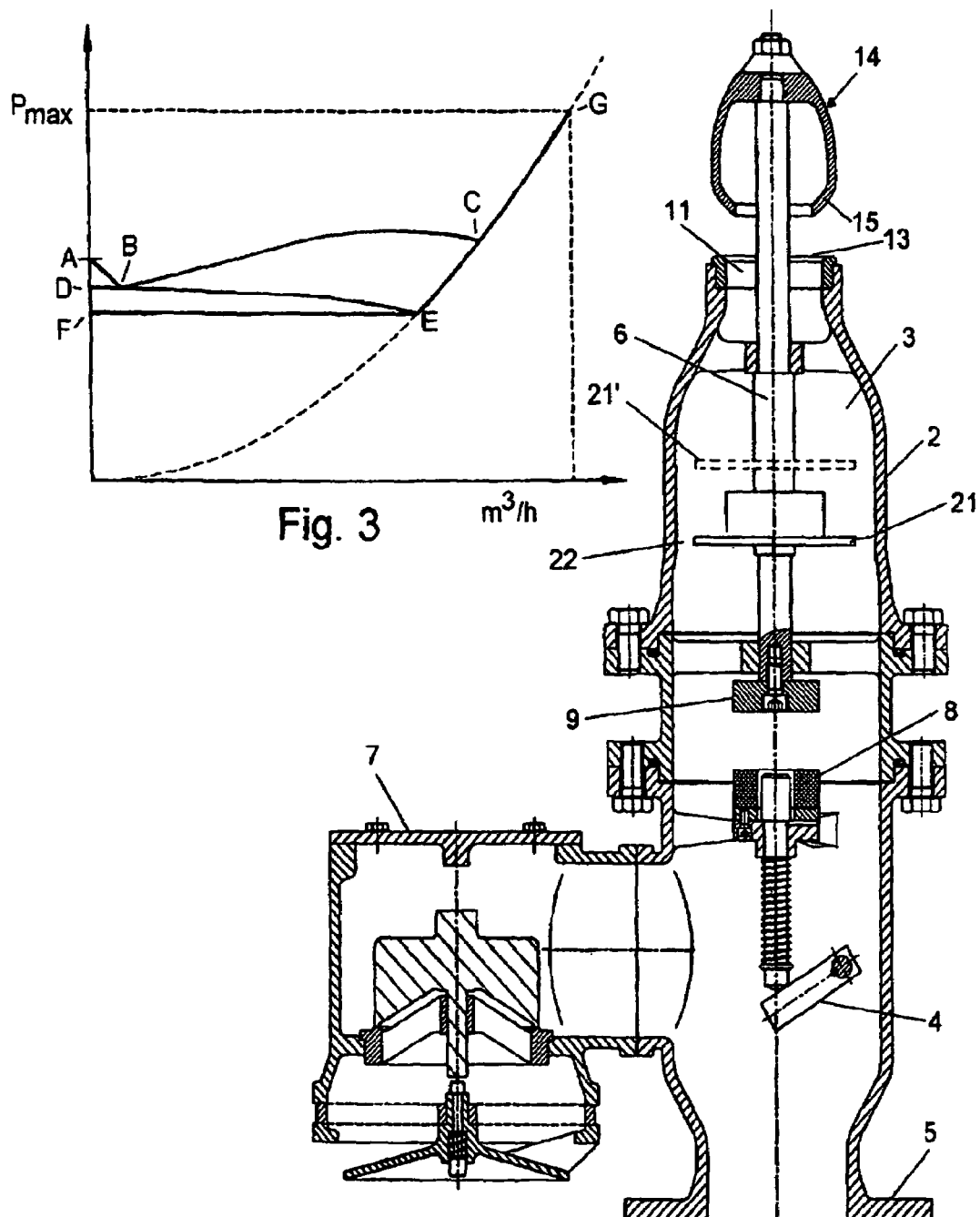
FIG. 2 shows a pressure valve of the general type illustrated in FIG. 1a, in the open state of the valve.
FIG. 3 shows characteristic curves of two different pressure valves configured in accordance with the invention; and wherein the super atmospheric pressure prevailing in the container is shown as a function of the volume of gas flowing out through the pressure valve.

In FIG. 2 the pressure valve is shown in its completely open state, wherein the valve body 14 is kept in the open position by the flowing gas. The downwardly oriented force on the valve body 14 contains contributions from the mass of the valve body 14, the mass of the connecting element 6, the mass of the weight load 12, the mass of either the magnet 8 or the body 9, depending on which of the two parts is mounted on the connecting element 6. The force of attraction $F_m$ between the magnet 8 and the body 9 does not significantly contribute as soon as the valve body 14 has moved slightly away from the position shown in FIG. 1.

In the shown, open position the pressure valve allows outflow of a given volume of gas per time unit as a function of the pressure within the container. This amount depends on the dimensions of the pressure valve and is selected in accordance with the size of the container, whereby it is ensured that gas contained in the container is allowed to flow out before the superatmospheric pressure exceeds a critical value for the container. It is noted that the valve body 14 can be configured with a downwardly open hollow cavity that contributes, to a small extent, to keeping the pressure valve in the open position. Furthermore, according to one embodiment the pressure valve can be provided with a number of further superjacent lifting plates 21' with decreasing surface areas $A_2$, as indicated in the Figure.

In order to enable that, to a particularly high degree, the desired effect of the pressure valve is obtained, the area $A_2$ of the lifting plate 21 should be much smaller than the cross-sectional area $A_3$ of the flow passage 3 in the entire movement area of the lifting plate 21. This follows from the free through-flow area $(A_3-A_2)$ in the flow passage 3 in the area at the lifting plate 21 constituting at any time between about 25% and about 55%, preferably between about 30% and about 50%, of the area $A_3$ of the flow passage in the area at the lifting plate 21. Reference is made to FIG. 1*b*. Albeit in FIG. 1*a* an embodiment is shown in which the flow passage 3 becomes more narrow approximately halfway between the lateral opening to the vacuum relief valve 7 and the area at the outflow mouthing 11, it is preferred that the flow passage 3 has the same cross-sectional area across the entire distance between the lateral opening to the vacuum relief valve 7 and the outflow mouthing 11, ie that in this area the tubular wall 2 is constituted by a cylindrical tube.

For comparison, FIG. 3 shows characteristic curves for two different examples $V_1$ and $V_2$ of pressure valves configured as shown in FIG. 1*a*, but wherein the free through-flow area $(A_3-A_2)$ between the container and the area above the lifting plate 21 are of different sizes. It will appear that the use of the magnet 8 provides that blow-out of a small volume gives rise to a modest pressure drop in the container, and that the curves from this point proceed with a relatively modest inclination to the dotted curve that reflects the blow-out volume for a fully open pressure valve.

It applies to valve $V_1$ that:

$$A_2 = A_1 \times 2.49$$

and $$A_3 = (A_1 \times 2.1) + A_2$$

whereas, for valve $V_2$, it applies that:

$$A_2 = A_1 \times 2.99$$

and $$A_3 = (A_1 \times 1.46) + A_2$$

Curves A-B-C-G and G-C-B-D show the opening and closing courses, respectively, for valve $V_1$, whereas curves A-B-E-G and G-E-F show the opening and closing courses, respectively, for valve $V_2$. Thus points D and F represent the pressures at which the respective pressure valves will close again. In both cases the point A represents the superatmospheric pressure in the container that causes the pressure valve to open.

It will appear from FIG. 3 that the difference between the opening pressure and the closing pressure, ie between the superatmospheric pressure in points A and F and A and D, respectively, constitutes 10%–20% of the value of the opening pressure A. To a wide extent, this will be achieved by the force of attraction $F_m$ of the magnet 8 defining between about 20% and about 35% of the force $F_c$.

Figure 4A:
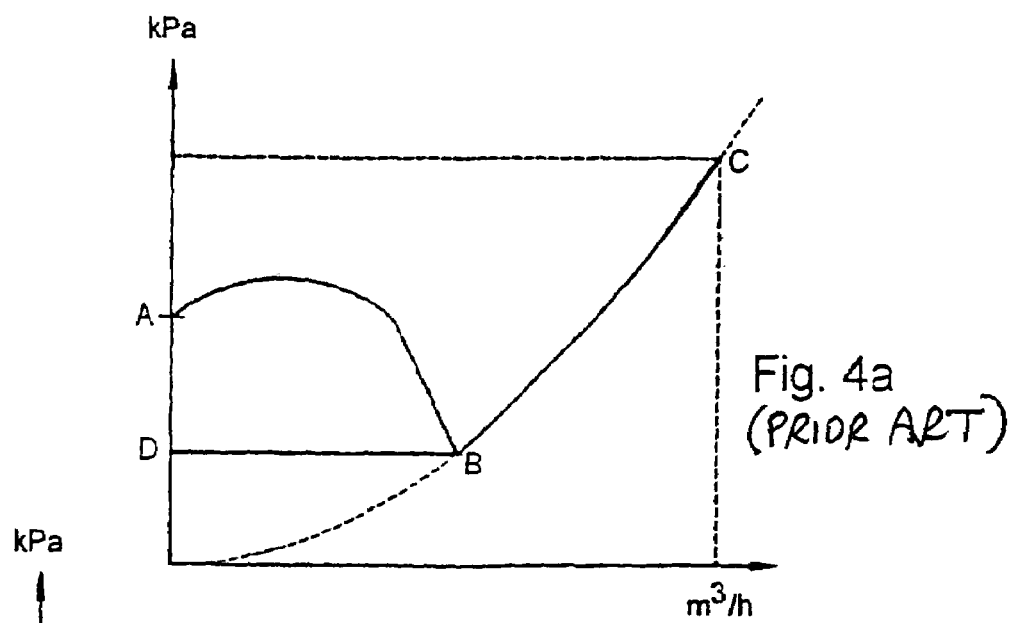
FIGS. 4a and b show the same type of characteristic curves for two prior art pressure valves, including a prior art pressure valve as shown in FIG. 4c.
Figure 4B:
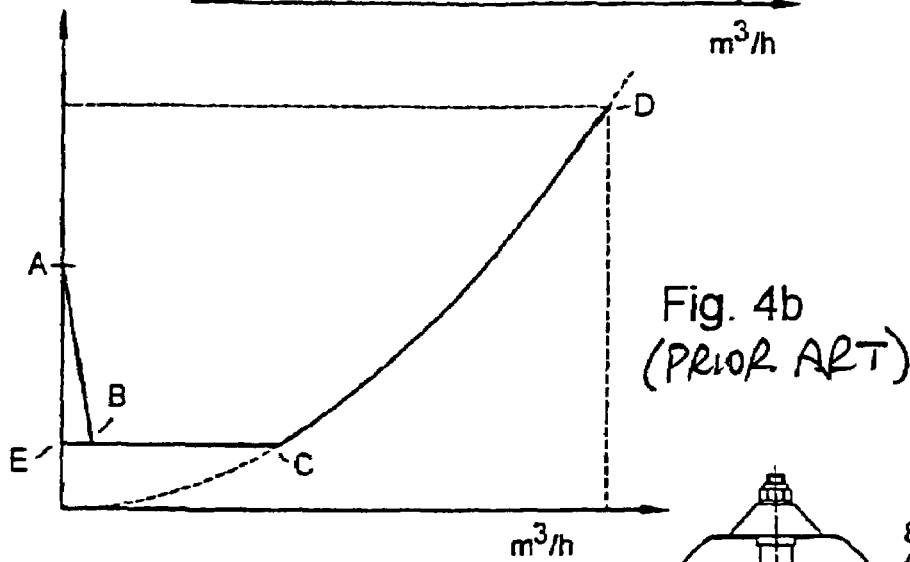
Figure 4C:
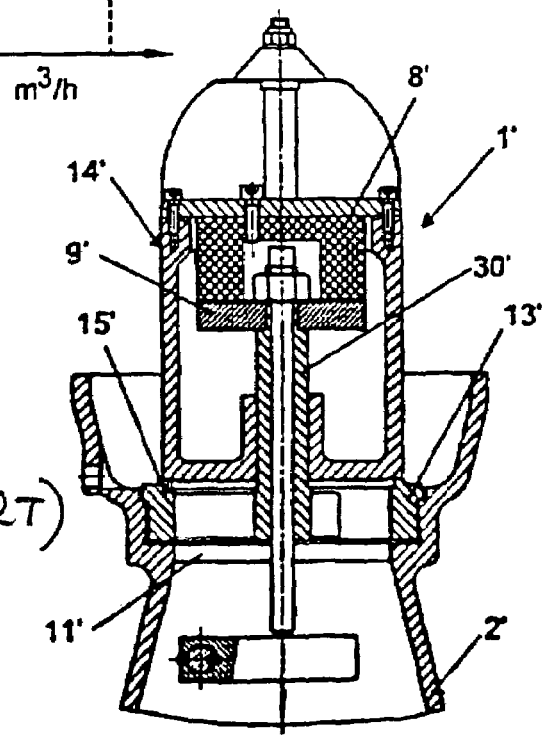

The effect by using, in accordance with the invention, a magnet in combination with a lifting plate is best illustrated by comparison of the course of the closing curves in FIG. 3 to the course of the closing curve for two conventional pressure valves. FIG. 4a shows the closing curve C-B-D for a pressure valve of the type shown in U.S. Pat. No. 5,873,384, while FIG. 4b shows the closing curve D-C-E for a prior art pressure valve of the type shown in FIG. 4c wherein is used a magnet shown by the numeral 8', but wherein a lifting plate is not used. It will appear that the difference between points A and E and A and D, respectively, typically corresponds to more than 50% of the value of the pressure in the point A.

In other words, by the invention it is ensured that the pressure valve will close when the pressure within the container has dropped by a relatively small value. In the conditions illustrated in FIGS. 4a and 4b, an unnecessarily large outflow of the gas contained in the container will occur before the pressure valve is closed. When an oil tank is concerned, an inexpedient boiling off of the liquid may hence occur. Alternatively, in case the container is used for transporting fruit or the like to be stored in an atmosphere of inert gas, it may be necessary to supply an unnecessarily large supplementary amount of said inert gas during the night when the ship's hull is cooled.

The invention claimed is:

1. A pressure valve for ensuring a pressure equalization between a closed container, in particular a cargo hold or a tank on a maritime carrier, and the ambient atmosphere, and comprising a valve housing with: a wall that defines a flow passage with an upwardly oriented outflow mouthing for gas in the container, a valve body arranged at the outflow mouthing, said valve body having a surface part suitable for collecting a gas flow that flows through the flow passage and around the valve body to form an upwardly oriented jet, said valve body having a downwardly oriented valve face configured for abutting on an associated valve seat in the outflow mouthing of the valve housing in order to define a closed state of the pressure valve; a lifting plate being, relative to the valve seat, arranged further down in the flow passage, which lifting plate has a surface area $A_2$ transversally to the flow passage that exceeds the cross sectional area $A_1$ of the flow passage at the valve seat; wherein the lifting plate is connected to the valve body in order to allow them to be moved as an aggregate valve unit between said closed state and a state in which the pressure valve is open; and wherein the pressure valve is configured such that the container is, at any time, in communication with the area above the lifting plate; wherein the pressure valve also comprises a magnet and a magnetizable body, when in said closed state a distance between the magnet and the magnetizable body is variable; where the force of attraction $F_m$ between the magnet and the magnetizable body and the mass of the lifting plate contribute to defining the abutment force $F_c$ of the valve body against the valve seat in the closed state of the pressure valve, wherein the free through-flow area $(A_3-A_2)$ in the flow passage at the lifting plate constitutes between approximately 25% and about 55% of the area $A_3$ of the flow passage at the lifting plate.

2. A pressure valve according to claim 1, wherein the magnet is fixedly mounted interiorly of the valve housing underneath the lifting plate; and the distance between the magnet the valve unit consisting of the lifting plate the valve body be varied.

3. A pressure valve according to claim 1, wherein the magnet is fixedly mounted in the valve body, and the magnetisable body is arranged in the area at the outflow mouthing, or vice versa.

4. A pressure valve according to claim 1, wherein the lifting plate and the valve body are rigidly connected by a rod-shaped connecting element; and the pressure valve comprises an actuator unit for producing a control movement of the valve body between the open and the closed position.

5. A pressure valve according to claim 1, wherein between the wall and the lifting plate, there is a free passage, whereby the container is, at any time, in communication with the area above the lifting plate.

6. A pressure valve according to claim 1, wherein the ratio $(A_1/A_3)$ assumes a value of between 0.16 and 0.35, wherein $A_3$ is the cross sectional area of the flow passage in the entire area of movement of the lifting plate.

7. A pressure valve according to claim 1, wherein the free through-flow area constitutes between about 30% and about 50% of the area $A_3$.

8. A pressure valve according to claim 1, wherein the force of attraction $F_m$ of the magnet defines between about 20% and about 35% of the force $F_c$.

* * * * *